(12) United States Patent
Usen et al.

(10) Patent No.: US 6,210,621 B1
(45) Date of Patent: Apr. 3, 2001

(54) METHOD FOR MAKING PLURAL CHAMBERED DISPENSING TUBES

(75) Inventors: Norman Usen, Marlboro; Thomas J. Duncan, Tom's River, both of NJ (US)

(73) Assignee: Enamelon, Inc., Cranbury, NJ (US)

( * ) Notice: Subject to any disclaimer, the term of this patent is extended or adjusted under 35 U.S.C. 154(b) by 0 days.

(21) Appl. No.: 09/205,602

(22) Filed: Dec. 4, 1998

(51) Int. Cl.⁷ .............................. B29C 45/14; B29C 45/56
(52) U.S. Cl. ..................... 264/263; 264/266; 264/318; 264/319
(58) Field of Search .................... 264/259, 260, 264/266, 267, 268, 252, 250, 328.7, 261, 263, 318, 319

(56) References Cited

U.S. PATENT DOCUMENTS

| | | | |
|---|---|---|---|
| 2,713,369 | * 7/1955 | Strahm | 264/268 |
| 3,286,010 | * 11/1966 | Groningen | 264/268 |
| 4,021,524 | * 5/1977 | Grimsley | 264/242 |
| 4,065,536 | * 12/1977 | Lucas | 264/98 |
| 4,518,554 | * 5/1985 | Hatekeyama et al. | 264/262 |
| 5,219,373 | * 6/1993 | Hatekayama et al. | 264/250 |
| 5,292,034 | * 3/1994 | Keller | 264/259 |
| 5,705,112 | * 1/1998 | Gram | 264/268 |

FOREIGN PATENT DOCUMENTS 197 12 736
    C1    3/1997  (DE) .

* cited by examiner

*Primary Examiner*—Angela Ortiz
(74) *Attorney, Agent, or Firm*—Stuart D. Frenkel

(57) ABSTRACT

A plural-chambered dispensing tube is made by a method involving molding a molten resin material into a tube head while a pre-finished tube body having a partition disposed therein is disposed within the molten resin material. Thus, the pre-finished tube body and partition become connected to the tube head as the latter is being molded. In this way, the tube body and the partition are molded into the tube head to form a uniform seal between the partition and the tube head and to improve the separation of the stored components.

5 Claims, 2 Drawing Sheets

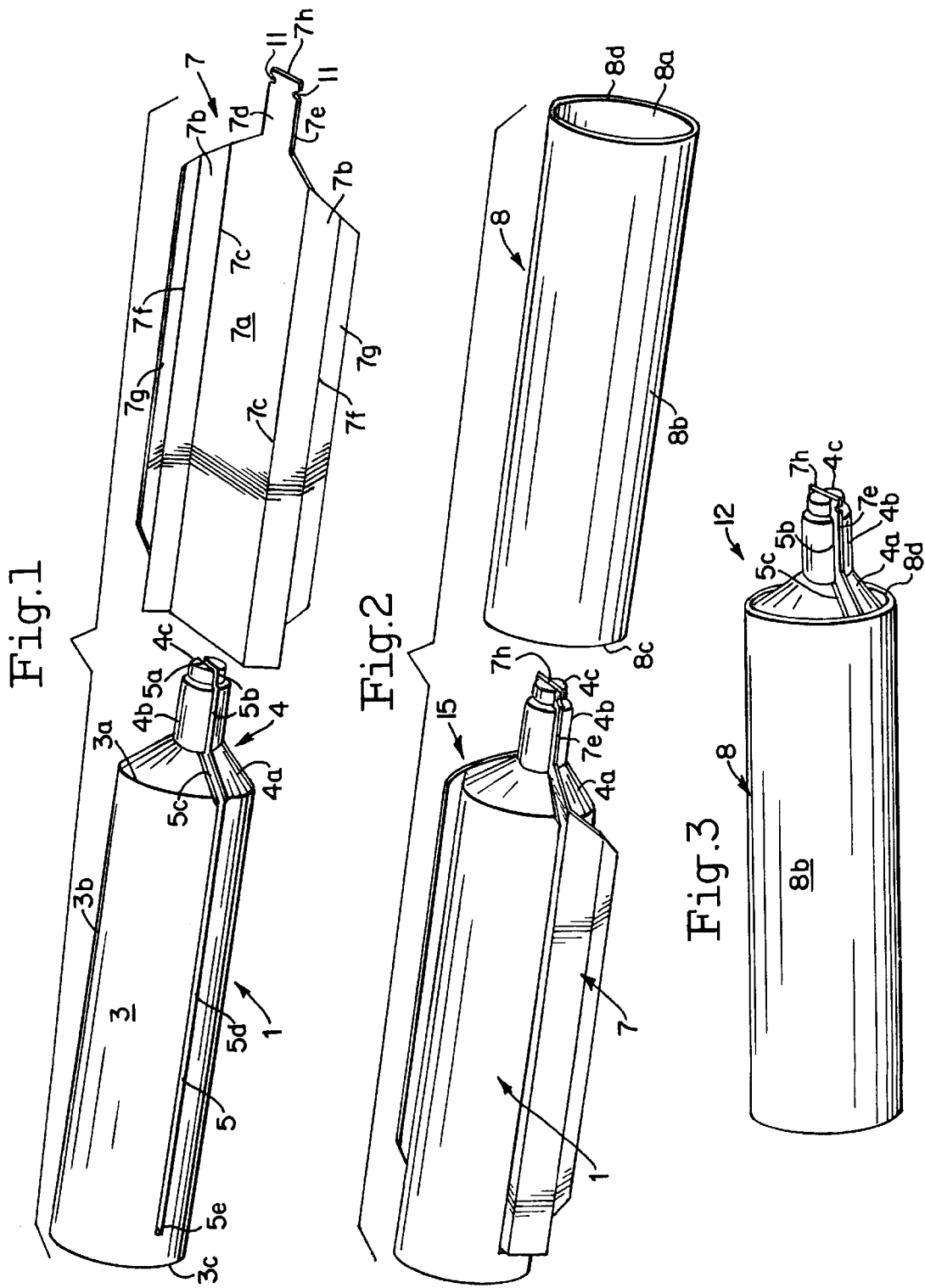

METHOD FOR MAKING PLURAL CHAMBERED DISPENSING TUBES

BACKGROUND OF THE INVENTION

The present invention relates to a plural chambered dispensing tube composed of a tube head, a tube body and a partition which divides the tube into separate and discrete compartments. More particularly, this invention relates to an improved method of making the aforementioned tube.

Many products on the market today, e.g., peroxide toothpastes, hair coloring, epoxy adhesives, and the like, require that the components therein be kept separate during storage (due, for example, to instability of the components) but dispensed simultaneously for use. Many of these products require costly dispensers and fabricating and packaging equipment to produce dispensing means which deliver the separate components simultaneously.

Products consisting of two flowable components such as pastes, gels, or liquids which must be stored separately are desirably packaged in containers having two compartments. Tubular bodies having chordal partitions are useful in providing two-compartment containers for two-component products which must have predetermined proportions of their components mixed at the time or point of use.

A number of longitudinally partitioned tubular bodies and dispensing containers having chordal partitions have been disclosed in the art. Reference is made, for example, to U.S. Pat. Nos. 3,290,422; 3,506,157; 3,307,738; 5,076,464; 5,244,120; and 5,269,411. However, none of the aforementioned patents has solved all the problems associated with providing longitudinally partitioned tubular bodies such as, for example, simplicity of manufacture, at a low cost and without changing consumers' habits.

There are many cleaning, drug and personal products which are marketed today in single dispensing packages which could be dramatically improved if an inexpensive dual dispensing device were available. Many of the dually dispensed products which are currently on the market and those which are not yet on the market can be dispensed from a tube rather than more costly dispensing means. A tube is a dispensing device that is readily available, familiar to most consumers, is comparatively less expensive and does not require elaborate filling equipment. If commercially available tubes can be easily and cheaply converted into dual-dispensing devices, it would be a great advantage to those either currently marketing or planning to market dually-dispensed products.

One method for making a multi-chambered dispensing device involves connecting a pre-finished tube body with a pre-finished tube head and then pushing a partition, which is structured in folded form and resilient in its lengthwise and crosswise directions, into the tube body. One of the crosswise sides of the partition may be connected (e.g., by gluing, heat sealing, etc.) to the tube head while the other crosswise side of the partition may be connected to the opposite side of the tube body. The inherent spring forces of the partition, which act in the lengthwise and crosswise directions, cause the lengthwise sides of the partition to press against the inside of the tube body and the crosswise sides of the partition to press against the tube body and the tube head (unless gluing on the inside of the tube head is provided).

A drawback to the method described above is that the step of installing a partition into the interior of a pre-finished tube body requires manufacturing subassembly steps.

Another method for making a multi-chambered dispensing device involves providing a pre-finished tube head connected to a partition by mechanical means and introducing the partition with the tube head attached thereto into a tube body to such an extent that the tube head can be connected to the tube body in a known manner, e.g., bonding the tube head and the tube body along the external circumference of the tube head. Although the introduction of the partition into a tube is simpler in this method than in the prior art method described above, this method, unlike the method described above, requires the additional step of connecting the tube head and the partition together prior to introduction of the partition into the tube body.

One problem which has been encountered with some plural-chambered dispensing tubes is that the partition dividing the tube into plural chambers tends to moves about, thereby adversely affecting dispensing ratios. Leakage between the chambers as a result of relatively weak bonds between the partition and the rest of the tube has also been a problem. Thus, in plural-chambered dispensing tubes, it is desirable that the means for dividing the tube into two or more chambers will provide uniform dispensing ratios of the components stored therein and prevent substantial leakage of the separated components.

Therefore, a primary object of this invention is to provide a method of making a plural-chambered dispensing tube which securely bonds the partition therein to the tube head and the tube body so as to allow uniform dispensing ratios and prevent substantial leakage between chambers.

Another object of this invention to provide a simpler and more economical method for making a plural-chambered dispensing tube having the characteristic set forth in the aforementioned object.

These and other objects which are achieved according to the present invention can be discerned from the following description.

SUMMARY OF THE INVENTION

The present invention provides a method for forming a plural-chambered dispensing tube composed of a tube head, a tube body and a partition disposed in the tube body and the tube head so as to divide the tube into two discrete chambers. In the method of this invention, a molten resin material is molded into a tube head while a pre-finished tube body having a partition housed therein is disposed within the molten resin material. In other words, the pre-finished tube body and partition become connected to the tube head as the latter is being molded.

More specifically, the method of this invention broadly involves the steps of:

(1) providing a partition-tube body assembly comprising a hollow tube body and a partition disposed in the tube body so as to divide the tube body into two discrete chambers, the assembly having a front end composed of a front circumferential end of the tube body and a head of the partition, (2) providing a liquid resin material to be molded into a tube head and inserting the front end of the assembly into the molten resin material; and (3) molding the tube head from the resin material while the front end of the assembly is disposed within the molten resin material so as to mold the tube head onto the front end of the assembly such that (i) edges of the partition head are bonded to an interior surface of the tube head to divide the tube head into two discrete chambers and (ii) the tube head is bonded to the front circumferential end of the tube body, thereby forming the plural-chambered dispensing tube.

A major advantage of the method of this invention is that it forms a uniform seal between the partition and the tube head, thus allowing uniform dispensing ratios and effective separation of the stored components.

Another advantage of the method of this invention is that it forms plural-chambered dispensing tubes with high efficiency.

A further important advantage provided by the method of this invention is that the end of the partition which runs into the tube head connects with the tube head as the latter is being formed. This itself represents a significant simplification of the production of a plural-chambered dispensing tube.

BRIEF DESCRIPTION OF THE DRAWINGS

FIG. 1 is an exploded vertical view of the mandrel and the partition.

FIG. 2 is an exploded vertical view of the tube body and the partition-supporting mandrel.

FIG. 3 is a vertical front elevational view of the partition-supporting mandrel/tube body assembly formed by fitting the tube body over the partition-supporting mandrel.

DETAILED DESCRIPTION OF THE INVENTION

Figure 4:
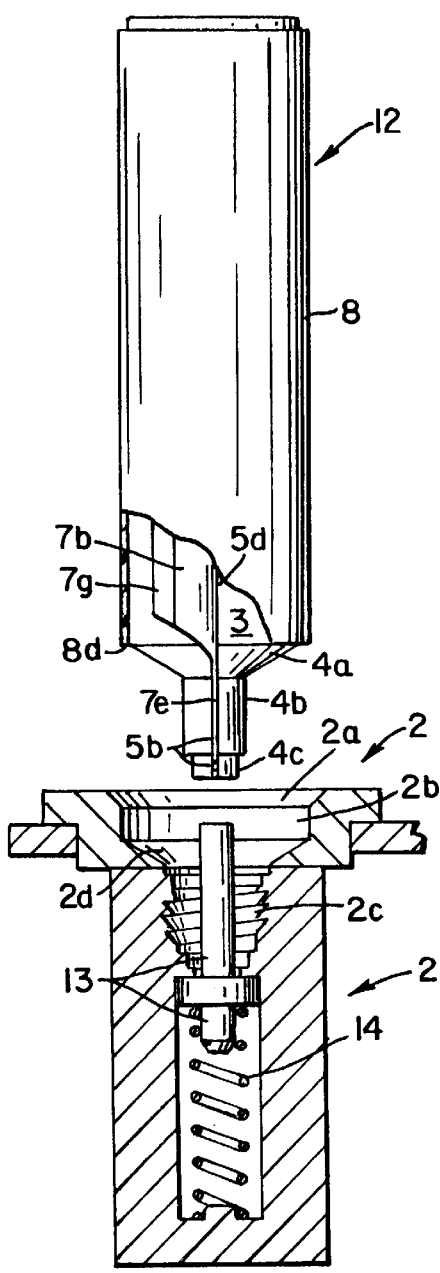
FIG. 4 is a vertical front elevational view, partly in cross-section, of the assembly shown in FIG. 3 disposed in axial alignment with a mold cavity charged with a molten resin material.
Figure 5:
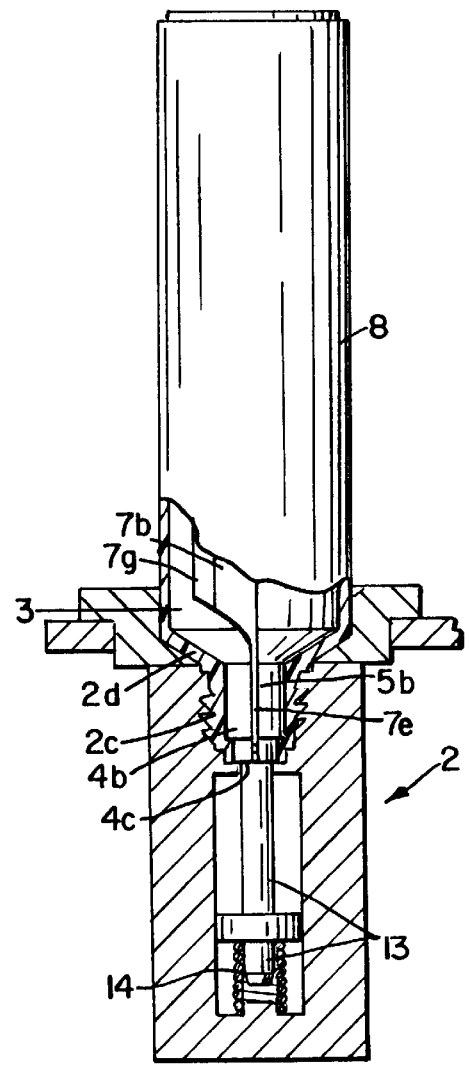
FIG. 5 is a vertical front elevational view, partly in cross-section, showing a front end of the FIG. 3 assembly inserted into the mold cavity illustrated in FIG. 4.

The tube-making method of this invention involves molding a tube head onto a pre-finished tube body in which a partition is disposed. In this way, the tube body and the partition are molded into the tube head to form a uniform seal between the partition and the tube head and to improve the separation of the stored components.

The molding process for forming the tube head is preferably a compression molding process, although an injection molding process may also be used.

Both injection molding and compression molding processes use a die composed of a matrix and a mandrel. In the injection molding process, a closed mold (wherein the mandrel has been moved into the matrix) is filled with the moldable material, e.g., a liquid plastic. In the compression molding process, an open matrix is first filled with the moldable material and then the mandrel is moved into the filled matrix. In both the injection molding and compression molding processes, the tube body is carried on the circumference of the mandrel. As a result, in both molding processes, the tube body is molded onto the tube head as the latter is being formed.

The method of the present invention will be described with reference to FIGS. 1–6 herein. In the method illustrated in these figures, the tube head is formed by compression molding.

The method illustrated in FIGS. 1–6 uses a die composed of a tube-shaped mandrel 1 and a matrix 2.

Mandrel 1 has a body 3 and a head 4. The body 3 is a cylindrical structure with a front circumferential edge 3a, a side wall 3b, and a bottom 3c. The mandrel head 4 has a frustoconical shoulder 4a, a vertical neck 4b and a top edge 4c. The frustoconical shoulder 4a is adjacent to the top of the mandrel body 3 such that the front circumferential edge 3a of the mandrel body 3 also constitutes the base (i.e., lower) circumferential edge of the shoulder 4a.

The mandrel 1 also has a slit 5 extending lengthwise and crosswise through the mandrel head and a portion of the mandrel body. More specifically, slit 5 is disposed in mandrel 1 so that mandrel head 4 has a facial slit portion 5a extending across the top edge 4c thereof, side slit portions 5b extending along opposite side walls of the neck, and side slit portions 5c extending along opposite side walls of the shoulder. Slit portions 5a, 5b and 5c are collectively referred to herein as the "head-slit portion" of mandrel slit 5. Furthermore, mandrel body 3 has side slit portions 5d extending along opposite surfaces of side wall 3b from top circumferential edge 3a to a slit-termination region 5e located near bottom 3c of mandrel body 3. Slit portions 5d are collectively referred to herein as the "body-slit portion" of the mandrel slit.

As discussed hereinbelow, the mandrel slit is designed to hold the partition.

Mandrel 1 is structured in such a way that the outer surface of mandrel head 4 will form the inside surface of the tube head 6 (see FIG. 6) to be formed. Specifically, the shoulder 4a of the mandrel head will form the inside surface (not shown) of the shoulder 6a of tube head 6, the neck 4b of mandrel head 4 will form the inside surface (not shown) of the neck 6b of tube head 6, and the top edge 4c of the mandrel head will form the outlet 6c of tube head 6.

In the method of this invention as shown in FIGS. 1–3, mandrel 1 is charged with a partition 7 to form a partition-supporting mandrel structure 15, and the partition-supporting mandrel structure 15 is then charged with a pre-finished tube body 8 to form a partition-supporting mandrel/tube body assembly 12.

Partition 7 is held in place in mandrel 1 by slit 5.

Partition 7 is composed of a spine 7a and flaps 7b. Spine 7a has lengthwise bendable side edges 7c (which are preferably scored as discussed hereinbelow) which separate the flaps 7b from spine 7a. In addition, spine 7a has a head 7d (i.e., the "partition head") outlined by head edges 7e. Opposite portions of head edges 7e preferably have notches 11 formed therein. Flaps 7b may also contain lengthwise bendable edges 7f which separate flaps 7b from outermost flaps 7g.

The contours of the spine of partition 7 correspond to the contours of slit 5 in mandrel 1. Thus, when partition 7 is placed onto the mandrel, spine 7a fits within slit 5 while the flaps 7b rest outside the slit against the side wall 3b of mandrel body 3. In the finished tube 10 made by the method of this invention, the head 7d of the partition spine 7a (i.e., the "partition head") divides the tube head 6 into two discrete chambers 6d and 6e, while the spine 7a divides the tube body 8 into two chambers (not shown).

Preferably, the distance between each of the flaps 7b and the side wall 3b of mandrel body 3 is from about 0.03 to about 1.0 millimeters, more preferably from about 0.4 to about 0.8 millimeters.

Because the flaps 7b of partition 7 rest against the side wall 3b of mandrel body 3, pre-finished tube body 8 can be pushed over the mandrel and the flaps in close proximity to the mandrel and flaps (see FIG. 2).

As shown in FIG. 2, tube body 8 is a cylindrical structure with an open top 8a, a side wall 8b, and an open bottom 8c.

The open top 8a is rimmed by a top (or front) circumferential edge 8d. The open bottom 8c is rimmed by a bottom circumferential edge (not shown).

As shown in FIG. 4, matrix 2 has an open top 2a, an upper body section 2b and a lower body section 2c. Upper body section 2b has a tube-head-forming mold cavity 2d which corresponds to the outer delimitation of the tube head 6 to be formed. Lower body section 2c has a thread-forming mold cavity 2e which is used to form thread 6f on the tube head.

In lower body section 2c, a hole punch 13, which is tensed in the axial direction by a spring 14, is mounted to move axially. Hole punch 13 is tensed in the direction of the mold cavity 2d by spring 14. When the front end of the partition-supporting mandrel/tube body assembly (i.e., the front circumferential end 8d of tube body 8 and partition head 7d) is introduced into the filled matrix, the hole punch 13 is pushed back by the partition-supporting mandrel counter to the force of spring 14. Hole punch 13 serves to keep the tube opening clear while the tube head is being molded.

A liquid resin material (not shown) in introduced through the open top 2a of matrix 2 into mold cavities 2d and 2e. The amount of resin material introduced into the matrix is that amount required to form the tube head.

After the matrix is filled with the resin material, the front end of the partition-supporting mandrel/tube body assembly 12 is moved into the filled matrix so as to press and form the resin material into tube head 6. During the pressing operation and the formation of the tube head, front circumferential edge 8d of tube body 8 is melted onto a base circumferential edge 6g of tube head 6, and head edges 7e of partition head 7d (i.e., the end of the partition which projects into the inside of the tube head) are melted onto a corresponding inside surface (not shown) of the tube bead. With this measure, both the shoulder area 6a and the outlet opening 6c of the tube head 6 are divided by the partition.

After molding of the tube head 6 is complete, the tube head and the portions of the tube body and partition melted onto the molded head are cooled. The cooling step allows corresponding melted portions to become bonded together.

During the cooling step of the method of this invention, the flaps 7b of partition 7 and the portion of the inner wall of tube body 8 in which the flaps are in contact in assembly 12 undergo a bonding process to cause the flaps and the corresponding inner wall surface of the tube body to bond together. To effect this bonding process, an inductive bonding device (not shown) can be used. In the bonding process, a portion of the resin material in matrix 2 is melted close to the lengthwise edge of the partition and in a strip-shaped zone of the tube body which lies opposite the lengthwise edge of the partition. After melting of the resin material near the lengthwise edges 7c of partition 7 and in the strip-shaped zone of tube body 8, the molten resin is cooled so as to form a bond between edges 7c of partition 7 and the strip-shaped zone of tube body 8.

Figure 6:
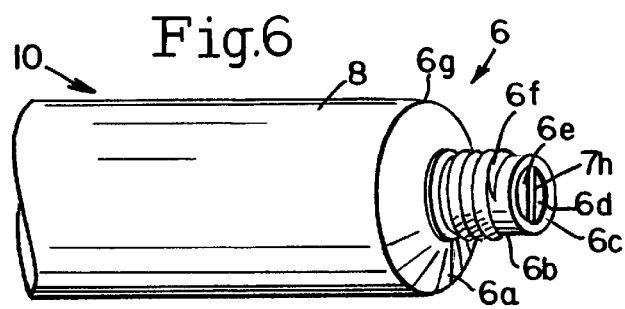
FIG. 6 is a perspective view of the front end of the finished dual-dispensing tube formed from the method of this invention.

After cooling is completed, lower body section 2c can be rotated about an axis to release the thread 6f of the finished tube head. The resulting assembly, referred to herein as the "partition-supporting mandrel/tube" structure or assembly is removed from the matrix and then ejected from the mandrel so as to the finished tube. The finished tube (composed of the partition 7, the tube body 8, the tube head 6 and, optionally, the cap (not shown)) is represented in FIG. 6 by reference numeral 10.

The method of this invention can be used to form the plural-chambered dispensing tube disclosed in U.S. Pat. No. 5,628,429 and in copending, commonly assigned, allowed U.S. patent application Ser. No. 08/855,524 (filed May 13, 1997) and Ser. No. 08/966,424 (filed Nov. 7, 1997), the foregoing patent and applications being hereby incorporated by reference herein in their entirety.

Partition 7 divides tube 10 into two distinct chambers before filling. By the addition of the partition, a conventional dispensing tube can be divided into separate and distinct compartments for dispensing more than one material from the same tube and, advantageously, co-dispense incompatible materials simultaneously and low cost.

The partition, once installed in the tube, seals against the walls of the tube by folded flaps formed preferably by scoring the partition material. The partition force fits against the inside collar of the tube and the partition spine extends up through the tube neck and, if desired, out the top orifice. In this way, the partition divides the internal volume of the tube in half so that each half can be filled with separate materials. After filling the two compartments and sealing the bottom of the tube, each product can be dispensed simultaneously but without contact until it leaves the tube.

The partition is preferably die cut with the width of the bottom thereof corresponding as nearly as possible to the internal width of the seal with the tube. Scores are preferably provided, e.g., embossed, longitudinally along both sides and near the edges of the partition such that the distance between the scores would be less than the diameter of the tube. This area or space between the scores constitutes the spine and the two areas extending outwardly from the scores and to the outer edge of the partition constitute the sealing flaps. The scores are formed so that the sealing flaps can be folded in opposite directions. For example, the right side flap would fold upwards and if folded completely would fold onto the front of the spine and the left side flap would fold downwards and if folded completely would fold onto the back of the spine. When inserted into the tube, the flaps and the spine generally conform to a "Z" shape.

The flaps may vary in width from the top to the bottom of the partition, including that area below the shoulder area, but must maintain a consistent or constant width for the spine. Increasing the overall width of the partition results in wider flaps which are desirable to maintain or improve flap-to-wall interaction in the sealed tube and as closely as possible to the flattened sealed end. The total width of the flaps plus the spine cannot exceed one-half the internal circumference of the tube at the flattened sealed end. Other than at the flattened sealed end, the total of the flaps and the spine (with the spine having a constant width) can range up to about 50% greater than the dimension at the bottom.

The width of the spine may range from about 50% to 99% of the diameter of the tube when measured substantially above its flattened end, and is preferably about 80% to 95% of the diameter. These dimensions provide adequate clearance for insertion of the partition into the tube and also optimum folding angles of the flaps so as to provide the greatest pressure exerted against the wall of the tube.

It is important that the bend (preferably, the scoring) disposed between the spine and flap retains a memory of its flat or planar starting configuration yet allows the flap to readily and evenly fold along the line provided by the bend (or score). Thus, when the flap is bent it should tend to return to the flat or planar original configuration so that when the flap is restricted from returning to its original completely flat condition it applies a force against the restricting object. When placed in the tube, the restricting object will be the surface of the tube wall. Because of the combination of the flexibility, shape and material of the flap and the force applied by the bent flap, a seal is formed between the flap and the tube wall. The seal can be improved if the ends of the flap are die cut on an angle to form an edge in the sealing direction of each flap. The angle of the edge formed should match as nearly as possible the inner surface of the periphery of the tube at the point of contact with the angled edge flap of the partition.

The flexibility of the flap and the force provided by the bend (e.g., score) is very critical to maintain a seal between the partition and the tube wall during product addition and during and after tube sealing. When a tube is sealed, the bottom of the tube is flattened. The partition is always installed into the tube so that it will be parallel with the flattened portion at the tube seal.

The portion of the flaps corresponding to the tube collar or shoulder are tapered so as to fit the contour of the inside or said tube collar, and inasmuch as the flaps are thinner they do not have to be folded back out of the way before insertion into the tube. The tapered portion of the partition fits into the open tube which begins splitting the adjacent flaps apart as the partition is pushed further into the tube.

In this embodiment, as with the single layer partition, the flaps do not have to be permanently prefolded with the possible loss of some of their memory and the force required to seal against the tube wall. Advantageously, this allows for easier stacking and facilitation of the handling of the partitions in automated inserting equipment.

The partition once installed in the tube results in a co-dispensing means which will maintain the individual integrity of the two separate components until they are dispensed side by side in the proper proportion by the normal action of squeezing the tube.

The partition material must be thick enough to withstand insertion without folding, buckling or crimping, yet be flexible enough to change form when the lower portion of the tube is flattened and sealed. The partition can be formed to fit any commercially available tube size.

While the partition can be formed by means of a plurality of methods including the relatively costly method of molding, the partition is preferably die cut.

The partition is designed so that in its full flattened position it is substantially the exact inside dimension of the tube if taken as completely flattened except for the shoulder and neck. In this way, the positioned partition transforms from a configuration of folded flaps which are force-fitted against a round tube's inner wall to a flattened form at the tube seal. A typical commercial tube, when sealed, goes from a round cylinder slowly flattening to being fully flattened at the seal. A flap of the partition goes from its maximum bend against a round tube's inner surface to slowly unbending as the tube flattens and the tube walls are further away from each other when taken along the axis of the seal. The width of the flap may vary and should preferably be sufficiently wide to optimize flap-to-tube wall interaction. The force resulting from the score will maintain pressure and thereby a seal against the tube wall until the partition is fully flat at the tube seal. The flexibility of the partition and the flap material therefore is critical, for in order to maintain a seal while the tube wall flattens out, the flap itself must twist as it opens up to its full flat width. The flap must also fold in a configuration so that when the tube is filled the product exerts pressure against the flap with the result that increased pressure is exerted so as to optimize the seal of the flap with the wall of the tube.

The overall width of the partition especially at the bottom seal area, is critical for it must be the same or very nearly the size of the flattened inside of the tube at the sealing area. It is characterized, therefore, as being about one-half the inside circumference of the tube. The partition must seal or crimp between the two inner sides of the flattened tube, and must be made from or coated with material to produce an effective sandwich seal. The seal is therefore made up of three layers which are tube, partition and tube. Laminated and plastic tubes are heat sealed so that the partition must be made of material or coated with material that is compatible and will seal with the tube.

The flaps seal the partition against the tube walls. The top portion of the partition is die cut to exactly duplicate the shape of the inside of the tube collar and neck. The partition also protrudes beyond the neck and out through the tube's dispensing orifice. This extension beyond the dispensing orifice of the tube can be shaped to form a linear seal inside the tube cap. This maintains separation of the two products even into the cap and provides a seal which prevents cross contamination of the products within the filled tube.

The top of the partition that extends beyond the dispensing orifice of the tube can have a notch cut on both sides which catch on or otherwise engage the flange of the collet positioned in the tube orifice to act as a positive lock to hold the partition in place during manufacture.

The partition can be coated with materials that physically or chemically seal the two compartments from cross contamination depending on the products to be separated and the degree of separation required. Alternatively, the partition may be heat-sealed or welded to the tube wall along the outer-most flap 7g.

Three major types of squeezable tubes commercially available are suitable for dispensing product for consumer and professional use. They may be classified as plastic, preferably thermoplastic, tubes fabricated from a monolayer of sheet material, tubes fabricated from a sheet or foil of metal, preferably aluminum, or tubes fabricated from one or more sheets of the above materials which are laminated into a single sheet.

The tube body can be made up of an inner thermoplastic layer, an outer thermoplastic layer and an intermediate barrier layer of metallic foil, e.g., aluminum, all coextensively bonded together. Additional layers may be used, including intermediate layers of paper and/or special bonding thermoplastic adhesives formulated to provide good adherence of the thermoplastic layers to the foil layer.

The partition can be made from a polymer coated board, e.g., paper or cardboard, from plastic sheet material, e.g., thermoplastic polymeric materials such as polyethylene, from laminated boards, or from laminates of boards and polymeric sheet materials or from any other inexpensive material that can be formed and can be heat sealed or mechanically crimped to provide sealed closure to commercially available tubes.

In accordance with the invention, a plurality of embodiments are also contemplated which provide chemical and/or mechanical seal means in addition to the basic pressure seal. For example, heat or sonic means may seal the partition or any part thereof to the tube from the outside of the tube, without effecting the integrity or appearance of the tube or the contents therein. In addition, non-contaminating materials can be put onto the edges of the finished partition which will improve the seal between the partition and the inner surface of the tube when inserted into the tube.

The dispensing tube formed by the method of this invention comprises a tubular body to one end of which is integrally united a threaded headpiece or collar and tube neck adapted to receive a screw cap. The headpiece or collar may be of any desired configuration and may be united to the body in any desirable manner. Preferably, the headpiece is of a thermoplastic material and is formed by molding and then fused to the body in any acceptable manner known in the art.

The tube body may be of single or of laminated construction comprising several distinct layers bonded together. Generally, the tube body is formed from a flat web or blank which has been fabricated in a preliminary operation, an example of which is one wherein one or more thermoplastic films are extruded directly onto and bonded to opposite sides of an endless intermediate substrate. By way of illustration and not limitation, the tube body can be made up of an inner thermoplastic layer, an outer thermoplastic layer and an intermediate barrier layer of metallic foil, e.g., aluminum, all coextensively bonded together. Additional layers may be used, including intermediate layers of paper and/or special bonding thermoplastic adhesives formulated to provide good adherence of the thermoplastic layers to the foil layer. Tubes of the type formed by the method of this invention are customarily formed and capped by the tube manufacturer and shipped to the packer with the bottom or filling end open. After being filled through the bottom end with a product, the tube is sealed with a transverse bottom end seal.

Any suitable device can be used to implement the method of this invention so long as the device allows the steps of the method to be performed in the correct sequence as described above.

A particularly suitable extrusion die machine which can be used to perform the method of this invention is composed of a die arranged on an indexing table. The indexing table is mounted to rotate around a fixed shaft through eight steps. The die is composed of a matrix and a mandrel.

The matrix has a mold cavity which is countersunk into and attached to the indexing table. The mold cavity corresponds to the outer delimitation of the tube head. Below the matrix and coaxial to it, there is a matrix part in which a second mold cavity is disposed. This second mold cavity is used to form the thread on the tube head. In the matrix part, a hole punch is tensed in the axial direction by a spring mounted to move axially. The hole punch is tensed in the direction of the first mold cavity by the spring, and when the mandrel is introduced into the matrix, the hole punch is pushed back counter to the force of the spring. The hole punch thus serves to keep the tube opening clear while the tube head is being molded. The matrix part can be rotated about a further axis in order to be able to release the thread of the finished tube head.

In the device, the mandrel is mounted to pivot around an axis. A pivoting device, such as a rack which engages in the gearing of a pivoting part with its teeth, can serve this purpose. The rack is connected with a ram which is mounted to shift axially in two bearing blocks attached to the indexing table. Between the bearing blocks, the ram is rigidly connected with a tenon which has a guide roll that is guided in a guide groove of a cam fixed in place like the fixed shaft around which the indexing table rotates. The guide groove has a progression in the cam such that the tenon is moved back and forth between the bearing blocks, causing the mandrel to be pivoted into the vertical or horizontal position.

The matrix is open toward the top and the mandrel is arranged to pivot from a horizontal position by an angle of 90°, into a vertical position on the indexing table, in which the mandrel is coaxial with the matrix. In the coaxial position, the mandrel can be shifted axially in order to be able to close and re-open the related matrix.

With such device, eight step positions are preferably carried out, each with a station assigned to it on the indexing table, the indexing table being driven by one step position in each instance.

Thus, at a first station, i.e., station 1, a charging device is used to charge the mandrel with a partition and then with a pre-finished tube body.

Station 2 will have a fixed material dispenser assigned to it. By means of this material dispenser, liquid resin is in introduced in free fall fashion into the matrix which is open toward the top and covered by the material dispenser. Another type of charging can consist of applying the material onto a material carrier which passes through the matrix in its lengthwise direction, which brings the material into its intended position in the matrix.

During indexing from station 2 to station 3, the mandrel is pivoted into the vertical position in which it is coaxial with the matrix.

By means of a toggle lever or other locking means assigned to station 3, the mandrel is moved into the matrix in its position coaxial to the matrix, in order to press the material introduced into the matrix into a tube head. The tube head is melted onto the tube body and the partition is melted onto the inside of the tube head, and in the region where the tube body is melted onto the tube head, also onto the inside of the tube body. The mandrel is held in this pressing position and remains there while the toggle lever or other locking means is retracted again.

In station 4, the mandrel remains in the pressing position, so that the pressed tube head with the tube body melted onto it and the partition can cool and solidify. For this purpose, the matrix and the mandrel can be cooled by a coolant.

In station 5, the mandrel continues to remain in the pressing position for cooling. Preferably, an inductive bonding device can be integrated into station 5 which connects, i.e., bonds the flaps of the partition to the inside surface of the tube body, close to their lengthwise edges of the partition. Melting takes place in that the material, i.e., the resin, is melted close to the lengthwise edges and in a strip-shaped zone which lies opposite them, running in the lengthwise direction of the tube body, and brought into engagement, i.e., pressed together, preferably under pressure. The bonding device is not arranged on the indexing table but rather peripherally separate from the latter, like the charging device at station 1. To perform a bonding process, the bonding device moves forward horizontally and subsequently passes over the mandrel with the tube body and the partition, in a vertical direction.

By means of a retraction device, the mandrel is removed from the matrix at station 6. The mandrel is removed from the matrix in an axial direction and thereby the pressing die (i.e., the matrix and the mandrel) is opened again, after the means which form a thread on the tube head have released the molded thread.

During indexing from station 6 to station 7, the mandrel with the head molded onto the tube body and the partition is pivoted back into the horizontal position.

By means of a screw-on device assigned to station 7, a closure, i.e., a cap, is screwed onto the tube head or pushed on in the case of push-on caps. This step, however, is not compulsory for implementation of the method of the instant invention.

At station 8, the tube, consisting of the tube body, the partition, the tube head and, optionally, the cap, has now been finished and is ejected from or pulled off the mandrel.

After the next cycle step, the mandrel is again charged with a tube body and a partition.

Although the device described above uses eight stations to implement eight process steps, it is also possible to distribute the eight steps among a different number of stations, e.g., ten stations. For example, between stations eight and one, another station with a charging device can be provided, which charges the mandrel only with the partition, prior to charging it with the tube body. Furthermore, another station could be provided between stations 3 and 4, between stations 4 and 5, or between stations 5 and 6, at which lengthwise bonding of the partition by means of the bonding device could take place. In other words, all of the process steps described in connection with station 1 (i.e., charging of the mandrel with the partition and then with the tube body) and station 5 (i.e., cooling of the formed/attached head with simultaneous bonding of lengthwise edges) can be separated and adapted analogous to the number of stations. However, fewer than eight stations can also be provided, if functions for the production of a multi-chamber tube are brought together.

As stated earlier herein, known methods of making multi-chambered tubes by assembling pre-finished tube components (i.e., tube body, tube head, partition, etc.) are time-consuming and can only be automated for efficient production with a great amount of effort. On the other hand, the method of the instant invention provides a method of making plural-chambered dispensing tubes which includes the step of forming chambers in the production process of the tube, thereby avoiding the disadvantages of the known manufacturing processes.

What is claimed is:

1. A method of making a plural-chambered dispensing tube comprising a tube body, a tube head and a partition which divides the tube into two discrete chambers, the method comprising:

(1) providing a hollow tube body, a partition and a mandrel, the mandrel being a tube-shaped structure comprising a head, a body and a slit extending in length-wise and cross-wise directions through the mandrel head and a portion of the mandrel body, (2) charging said mandrel with the partition to form a partition-supporting mandrel structure, a first portion of the partition fitting within the mandrel slit and a second portion of the partition resting against an outer side wall of the mandrel body;

(3) charging the partition-supporting mandrel structure with the tube body assembly having a front end comprising a front circumferential end of the tube body and a head of the partition, the second portion of the partition being disposed between the outer side wall of the mandrel body and an inner side wall of the tube body;

(4) providing a liquid resin material to be molded into a tube head and inserting the front end of the assembly into said resin material;

(5) molding the tube head from said resin material while said front end of the assembly is disposed within the resin material so as to mold the tube head onto the front end of the assembly such that (i) edges of the partition head are bonded to an interior surface of the tube head to divide the tube head into two discrete chambers and (ii) the tube head is bonded to the front circumferential end of the tube body;

(6) effecting bonding between the second portion of the partition and corresponding portions of the inner side wall of the tube body, thereby forming the plural-chambered dispensing tube.

2. A method according to claim 1, wherein the mandrel slit comprises a head-slit portion and a body-slit portion, the head-slit portion extending lengthwise and crosswise through the mandrel head, and the body-slit portion extending lengthwise and crosswise from the head-slit through a portion of the mandrel body; further wherein the first portion of the partition comprises a spine and the second portion of the partition comprises two flaps extending from lengthwise edges of the spine, the spine containing a head portion and a body portion, the head portion constituting the head portion of the partition and the body portion being disposed between the lengthwise edges of the spine; further wherein step (2) of the method comprises charging the mandrel with the partition such that the head portion of the spine is placed within the head-slit, the body portion of the spine is placed within the body-slit and the flaps rest against the outer side wall of the mandrel body.

3. A method according to claim 1, wherein step (4) comprises:

(a) providing a matrix having a tube-head-forming mold cavity, (b) filling said tube-head-forming mold cavity with said resin material, and (c) inserting the front end of the partition-supporting mandrel/tube body assembly into the resin material in the tube-head-forming mold cavity.

4. A method according to claim 3, wherein step (5) comprises:

(a) subjecting the resin material in the tube-head-forming mold cavity to a compression molding process to form the tube head while the front end of the partition-supporting mandrel/tube body assembly is disposed in the resin material, thereby molding the tube head onto the front end of the assembly; and (b) cooling the molded tube head and the front end of the assembly, thereby forming the plural-chambered dispensing tube.

5. A method according to claim 1, further comprising forming a thread on the molded tube head.

* * * * *